(12) United States Patent
Lazaris et al.

(10) Patent No.: US 6,644,173 B2
(45) Date of Patent: Nov. 11, 2003

(54) BEVERAGE FILTER CARTRIDGE HOLDER

(75) Inventors: Nicholas G. Lazaris, Newton, MA (US); Roderick H. Beaulieu, Cumberland, RI (US)

(73) Assignee: Keuring, Incorporated, Wakefield, MA (US)

( * ) Notice: Subject to any disclaimer, the term of this patent is extended or adjusted under 35 U.S.C. 154(b) by 0 days.

(21) Appl. No.: 10/116,322

(22) Filed: Apr. 4, 2002

(65) Prior Publication Data

US 2002/0148357 A1 Oct. 17, 2002

Related U.S. Application Data

(60) Provisional application No. 60/283,267, filed on Apr. 11, 2001.

(51) Int. Cl.$^7$ ................................................. A47J 31/40
(52) U.S. Cl. ........................................ 99/295; 99/302 R
(58) Field of Search ............................... 99/295, 302 R, 99/289 R, 299, 300

(56) References Cited

U.S. PATENT DOCUMENTS

| 3,292,527 A | 12/1966 | Stasse |
| 5,656,316 A | 8/1997 | Fond et al. |
| 6,079,315 A | 6/2000 | Beaulieu et al. |

FOREIGN PATENT DOCUMENTS

| WO | WO 98/47418 | 10/1998 |
| WO | WO 00/44268 | 4/2000 |

*Primary Examiner*—Reginald L. Alexander
(74) *Attorney, Agent, or Firm*—Samuels, Gauthier & Stevens

(57) ABSTRACT

A beverage is brewed by infusing heated liquid with a dry beverage medium contained in a first chamber of a disposable cartridge. The cartridge is internally subdivided by a permeable filter separating the first chamber from a second chamber, with both chambers being closed by piercable lid on one side of the cartridge. During a brew cycle, the cartridge is clamped between confronting arms, an the cartridge lid is pierced by inlet and outlet probes carried by a platen and arranged to communicate respectively with the first and second cartridge chambers. Heated liquid is admitted in to the first chamber via the inlet probe for infusion with the dry beverage medium, and the resulting brewed beverage permeates through the filter into the second chamber from which it exits via the outlet probe.

3 Claims, 4 Drawing Sheets

BEVERAGE FILTER CARTRIDGE HOLDER

CROSS REFERENCE TO RELATED APPLICATIONS

This application claims priority of provisional patent application Ser. No. 60/283,267 filed Apr. 11, 2001.

This invention relates to beverage filter cartridges of the type described in U.S. patent application Ser. No. 09/782,665 filed Feb. 13, 2001 and entitled Disposable Single Serve Beverage Filter Cartridge, the disclosure of which is herein incorporated by reference.

BACKGROUND DISCUSSION

1. Field of the Invention

This invention relates generally to brewers designed to produce single beverage servings by injecting heated liquid into disposable filter cartridges containing a dry beverage medium, and is concerned in particular with an improved beverage filter cartridge holder for such brewers.

2. Description of the Prior Art

A known disposable beverage filter cartridge is disclosed in U.S. Pat. No. 5,840,189 (Sylvan et al.) The cartridge includes a piercable cup-shaped base internally subdivided by a permeable filter into first and second chambers. A dry beverage medium is contained in the first chamber, and the cup-shaped base is closed by a piercable lid.

In use, the lid and base are pierced, respectively by inlet and outlet probes acting in opposite directions. The inlet probe serves to admit heated liquid into the first chamber where it infuses with the beverage medium to produce a beverage. The beverage passes through the filter into the second chamber, from which it exits via the outlet probe.

This known beverage filter cartridge has gained rapid and increasingly widespread acceptance, notwithstanding certain problems and disadvantages relating to its use that have persisted since its initial introduction.

For example, as compared to the lid, the bottom of the cup-shaped base is relatively thick, with a higher resistance to piercing. The bottom cannot easily be thinned without adversely affecting the required thickness of the cup's sidewall to prevent permeability to oxygen and the ability to connect the filter material to the sidewall without damaging the oxygen barrier material. Thus, in the course of being punctured by the outlet probe, the bottom exhibits a tendency to distort inwardly, with an accompanying buckling of the container sidewall. Bottom distortion accompanied by sidewall bucking can adversely affect the puncturing process, resulting in leakage around the outlet probe.

A related problem stems from the need to equip brewers with expensive metallic outlet probes that can be sharpened to the extent necessary to effect piercing of the more resistant container bottoms, and that can resist wear over prolonged periods of use.

As disclosed in the above referenced patent application, these problems have been addressed by redesigning and rearranging the cartridge components, resulting in the first and second chambers being accessible, respectively, by inlet and outlet probes acting on one side of the cartridges to pierce only the lid.

SUMMARY OF THE INVENTION

The present invention has as its principal objective the provision of a modified beverage filter cartridge holder incorporating inlet and outlet probes arranged to access the first and second chambers of the redesigned cartridge by piercing only the cartridge lid.

This and other objectives, features and advantages of the present invention will now be described in greater detail with reference to the accompanying drawings, wherein:

Figure 1:
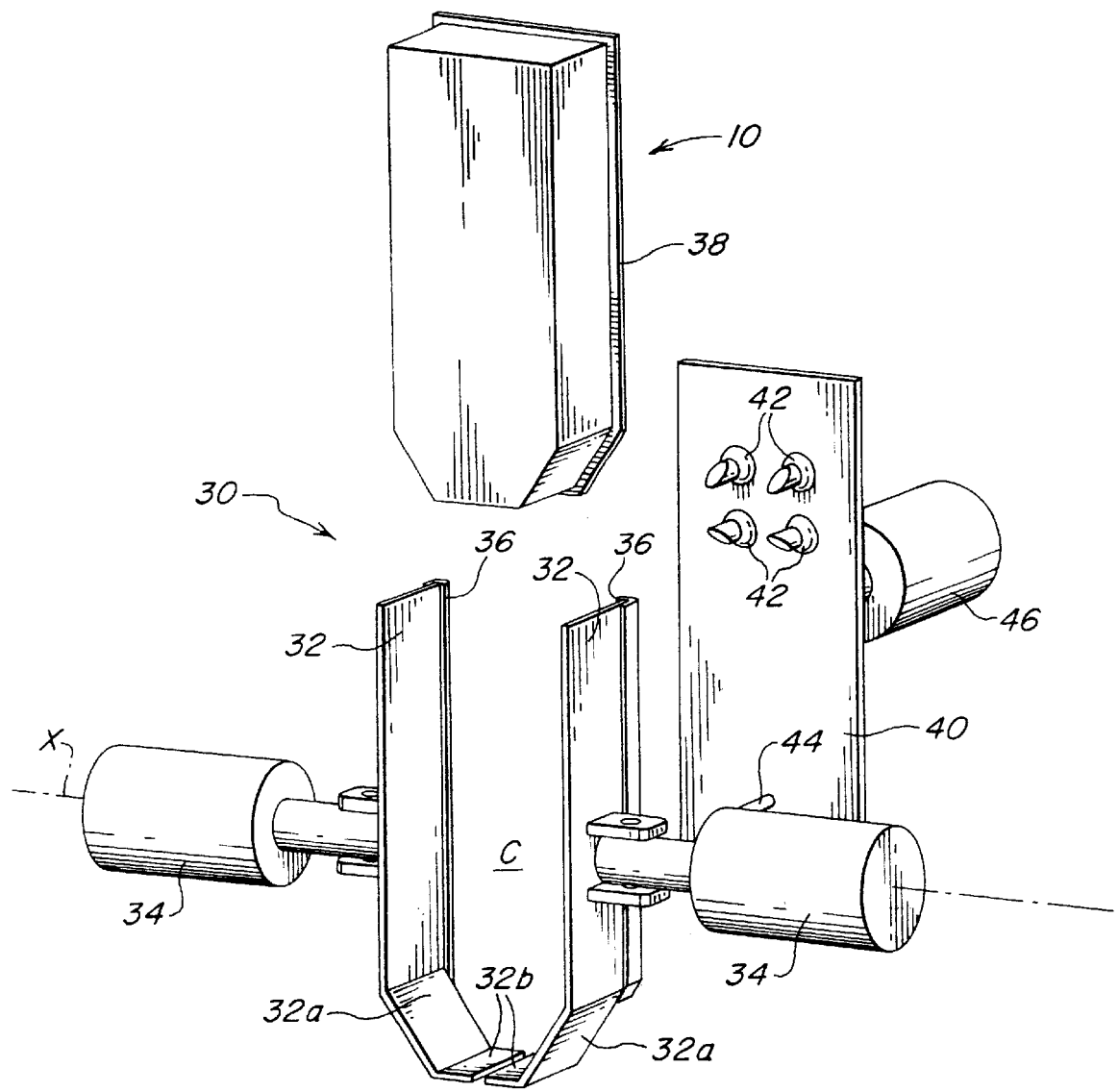
FIG. 1 is a perspective view of a holder in accordance with the present invention, with the principal components of the holder shown in a retracted state in preparation for receipt of a beverage filter cartridge.

Referring initially to FIGS. 5–8, a beverage filter cartridge of the type designed for use with the holder of the present invention is generally depicted at 10. The cartridge includes an outer container 12, a filter element 14 and a lid 16.

The outer container 12 is generally tray-shaped, with a bottom wall 12a, a side wall 12b, and a series of laterally spaced support ribs 12c projecting upwardly from the bottom wall and extending in parallel relationship in the lengthwise direction of the container.

Figure 7:
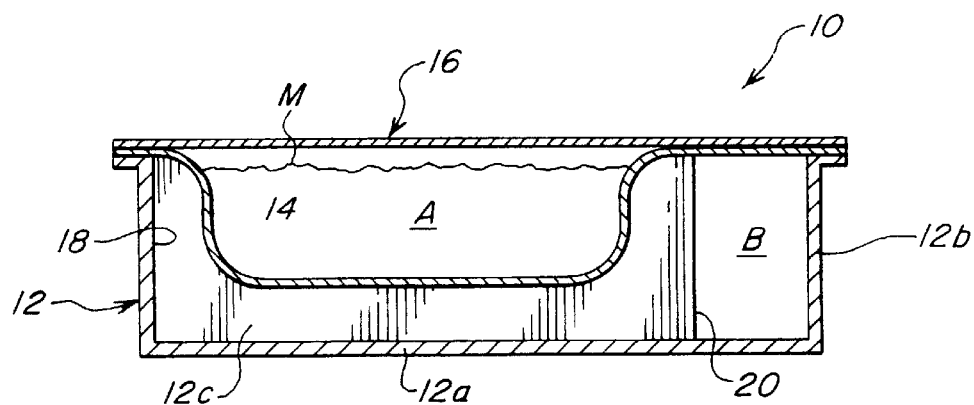
FIG. 7 is a sectional view taken along line 7—7 of FIG. 6.
Figure 8:
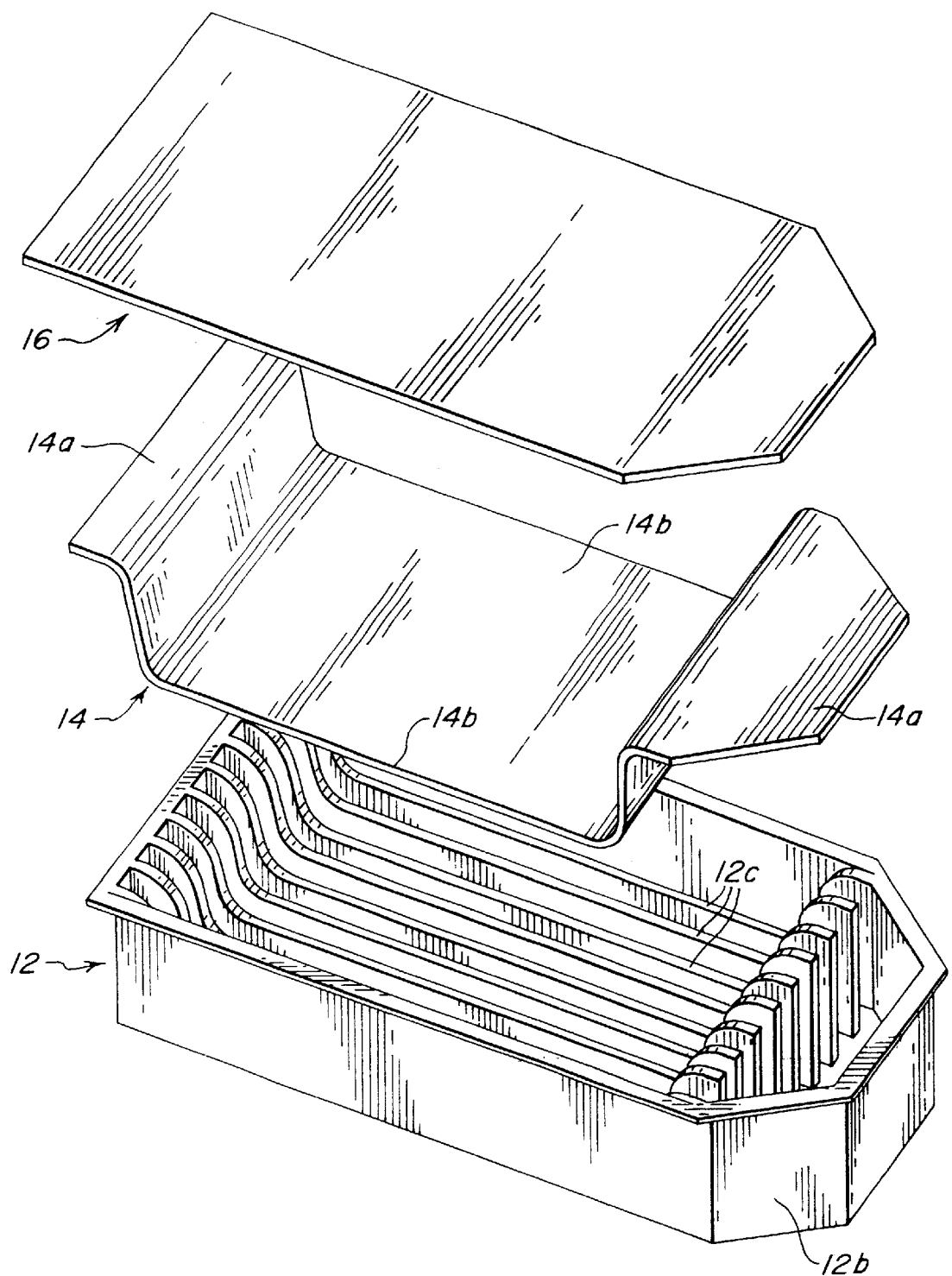
FIG. 8 is an exploded perspective view of the components of the beverage filter cartridge.

As can be best seen in FIG. 7, the ribs 12c join the side wall 12 as at 18, and then curve downwardly and extend in parallel relationship to the bottom wall before again curving upwardly to terminate as at 20, thereby forming an exit chamber B.

The filter element 14 is formed from sheet material shaped to conform to the shape of the upper edges of the support ribs. The filter element is received in the container 12, with the edges 14a of its opposite ends overlapping and sealed to the upper edge of the container side wall 12b, and with the edges 14b of its sides overlapping and sealed to outermost ribs 12c which project integrally from the container side wall. When thus positioned, the filter element defines an inner chamber A separate from the exit chamber B.

A beverage medium M, typically ground coffee, is loaded into chamber A, after which the lid 16 is sealed to the upper edge of the container wall 12b (and over any overlapping sealed edge portions of the filter).

The outer container 12 and lid 16 are impermeable, with the latter additionally being yieldably piercable. The filter element 14 is permeable.

Turning now to FIG. 1, a cartridge holder in accordance with the present invention is generally depicted at 30. The holder includes a pair of mutually spaced confronting arms 32 with inwardly inclined lower segments 32a terminating in horizontal shelves 32b. The arms 32 define opposite sides of a brewing chamber "C".

Figure 2:
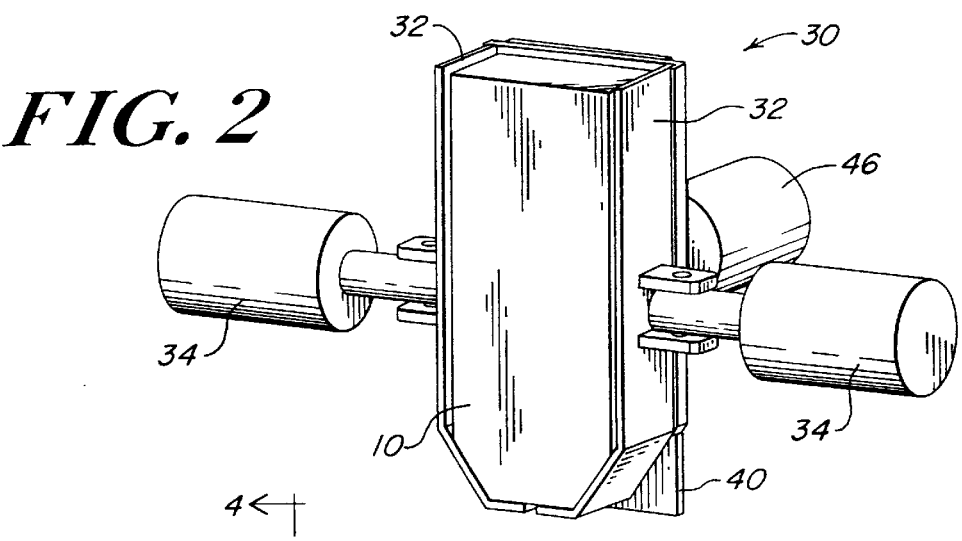
FIG. 2 is a view similar to FIG. 1 showing the holder components in operative positions during a brewing cycle.
Figure 3:
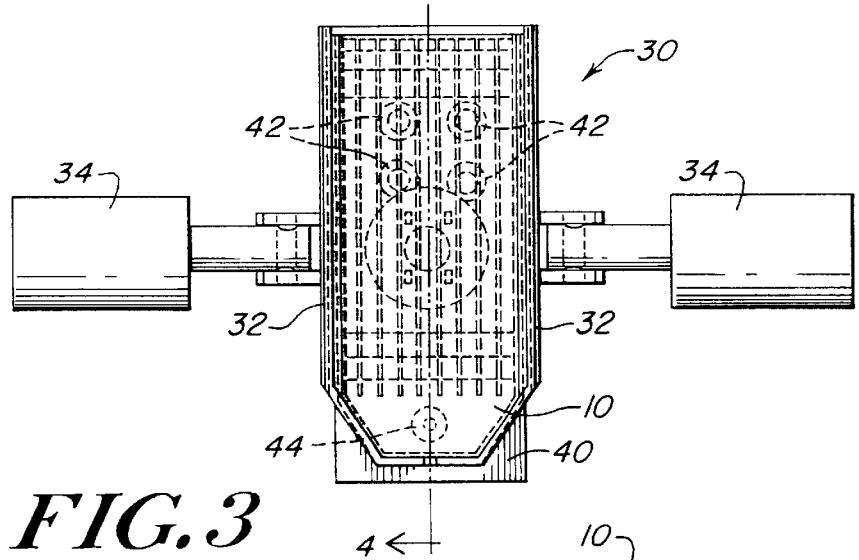
FIG. 3 is a front elevational view of the holder in the condition depicted in FIG. 2.

A first operating means, which may for example comprise pneumatic cylinders 34, is operable to shift the arms 32 in opposite directions between retracted positions, as shown in FIG. 1, and advanced positions, as shown in FIGS. 2 and 3. In their retracted positions, the arms accommodate insertion and removal of a cartridge 10 into and out of the brewing chamber C. The confronting surfaces of the arms may be grooved as at 36 to slidably receive a lip 38 projecting from opposite sides of the cartridge 10, and thus guide the cartridge during its insertion into the brewing chamber. In their advanced positions, the arms clamp a cartridge 10 therebetween in the brewing chamber C.

Figure 4:
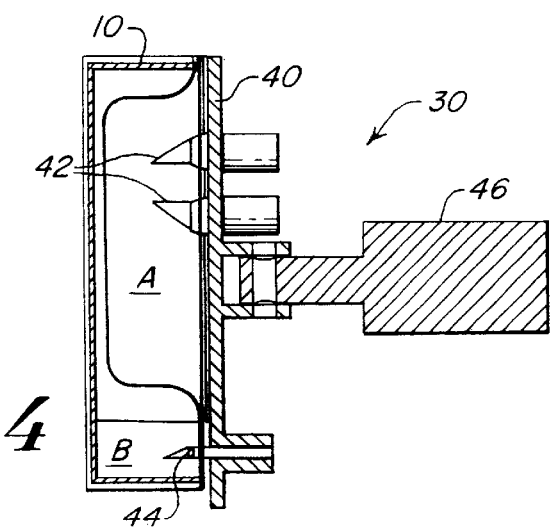
FIG. 4 is a sectional view taken along line 4—4 of FIG. 3.
Figure 5:
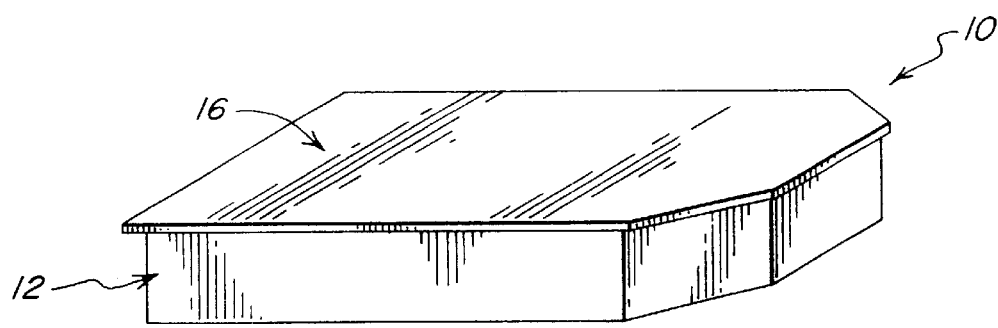
FIG. 5 is a perspective view of a beverage filter cartridge.
Figure 6:
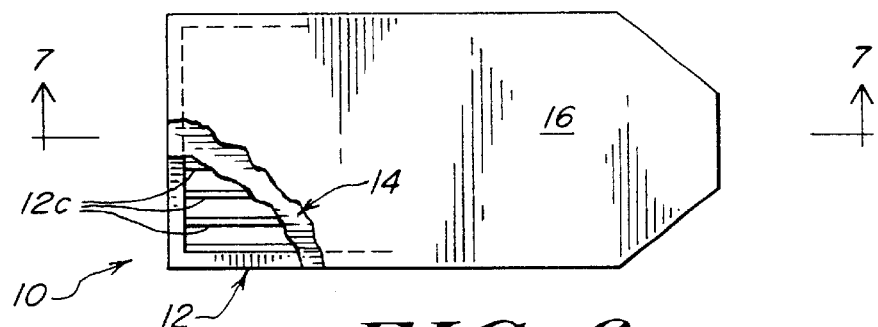
FIG. 6 is a top plan view of the beverage filter cartridge, with portions of the lid and filter broken away.

A platen 40 carries an array of tubular inlet probes 42 and a tubular outlet probe 44. A second operating means, which again for example may comprise a pneumatic cylinder 46, operates to shift the platen in opposite directions between a retracted position, as shown in FIG. 1, and an advanced position as shown in FIGS. 2–4. The direction of platen 40 movement is orthogonal with respect to the direction of movement of the arms 32.

When the platen 40 is in its retracted position, the inlet and outlet probes 42, 44 are outside the brewing chamber C and are spaced from the lid 16 of a cartridge received in the brewing chamber. When the platen is in its advanced position, the inlet and outlet probes 42, 44 pierce the cartridge lid 16 and communicate respectively with the cartridge chambers A and B.

During a brew cycle, heated liquid (typically hot water) is admitted under pressure into cartridge chamber A via the inlet probes 42. The heated liquid infuses with the beverage medium to produce a beverage. The beverage permeates through the filter 14 into chamber B, from which its exits via outlet probe 44.

At the conclusion of the brew cycle, the platen and arms are returned to their respective retracted positions, thus freeing the spent cartridge for removal from the brewing chamber C. Cartridge removal may be accomplished manually, or the arms 32 may be rotated about an axis X to dump the spent cartridge into an underlying bin (not shown).

In light of the foregoing, it will now be apparent to those skilled in the art that various changes and modifications may be made to the embodiment herein chosen for purposes of disclosure without departing from the inventive concepts defined by the appended claims. Non-limiting examples of such changes and modifications would include varying the number of inlet and outlet probes 42, 44, modifying the shapes and sizes of the arms 32 and platen 40 to accommodate differently shaped cartridges, and the use of different operating mechanisms to shift the arms and platen between their retracted and advanced positions.

I claim:

1. In an apparatus for brewing a beverage by infusing heated liquid with a beverage medium contained in a first chamber of a disposable single serve cartridge, said cartridge being internally subdivided by a permeable filter separating said first chamber from a second chamber, both of said chambers being closed by a piercable lid on one side of said cartridge, a holder for retaining said cartridge during a brew cycle, said holder comprising:

a pair of mutually spaced confronting arms defined opposite sides of a brewing chamber;

first operating means for shifting said arms in opposite directions between retracted positions accommodating insertion and removal of one of said cartridges into and out of said chamber, and advanced position clamping the said one cartridge therebetween;

a platen;

inlet and outlet probes carried by said platen; and second operating means for shifting said platen in opposite directions between a retracted position at which said inlet and outlet probes are outside of said brewing chamber and spaced from the lid of a cartridge clamped between said arms, and an advanced position at which said inlet and outlet probes pierce said lid and communicate respectively with said first and second chambers, whereupon heated liquid may be admitted into said first chamber via said inlet probe for infusion with said beverage medium, with the resulting brewed beverage permeating through said filter into said second chamber for removal therefrom via said outlet probe.

2. The holder of claim 1 wherein the direction of movement of said platen is orthogonal with respect to the direction of movement of said arms.

3. The holder of claim 1 wherein said platen is provided with multiple inlet probes.

* * * * *